(12) United States Patent
Wittkopp

(10) Patent No.: US 7,237,662 B2
(45) Date of Patent: Jul. 3, 2007

(54) SELECTABLE ONE-WAY TORQUE TRANSMITTER WITH A FRICTION TORQUE TRANSMITTER ACTUATOR

(75) Inventor: Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 146 days.

(21) Appl. No.: 11/071,274

(22) Filed: Mar. 3, 2005

(65) Prior Publication Data

US 2006/0196747 A1 Sep. 7, 2006

(51) Int. Cl.
*F16D 25/062* (2006.01)
(52) U.S. Cl. .................. 192/35; 192/38; 192/85 AA
(58) Field of Classification Search ............ 192/38
See application file for complete search history.

(56) References Cited

U.S. PATENT DOCUMENTS

| 4,123,952 | A | * | 11/1978 | Wayman | 475/59 |
| 4,380,179 | A | * | 4/1983 | Kubo et al. | 475/159 |
| 6,481,548 | B2 | * | 11/2002 | Monahan et al. | 192/38 |
| 6,688,442 | B2 | * | 2/2004 | Nojiri et al. | 192/13 R |
| 6,745,880 | B1 | * | 6/2004 | Yuergens | 192/44 |
| 2003/0119623 | A1 | * | 6/2003 | Stevenson et al. | 475/275 |

FOREIGN PATENT DOCUMENTS

GB 2035479 A * 6/1980

* cited by examiner

*Primary Examiner*—Richard M. Lorence
(74) *Attorney, Agent, or Firm*—Dan L. Thompson

(57) ABSTRACT

A selectively operable one-way torque-transmitting mechanism has a friction actuator, which is operable to adjust the position of torque-transmitting members between the inner and outer race of the selectable one-way torque-transmitting mechanism. In an unactuated position of the friction actuator, the torque-transmitting members will permit rotation in one direction and prevent rotation in the opposite direction. In the actuated position, the torque-transmitting directional functions are reversed.

3 Claims, 2 Drawing Sheets

SELECTABLE ONE-WAY TORQUE TRANSMITTER WITH A FRICTION TORQUE TRANSMITTER ACTUATOR

TECHNICAL FIELD

This invention relates to one-way torque-transmitting devices and, more particularly, to one-way torque-transmitting devices that have a selectable mechanism for determining in which direction of rotation the one-way torque transmitter is effective.

BACKGROUND OF THE INVENTION

Many of today's power transmissions, especially multi-speed automatic shifting power transmissions, have one or more one-way torque-transmitting devices commonly called one-way clutches. The engineering community provides the nomenclature of one-way clutch whether the one-way device is a holding or retarding device or a rotational transmitting device. The terminology of one-way torque transmitter and one-way clutch will both be used in this description.

As a general rule, the one-way clutch has one direction of operation for performing the torque-transmitting function and in the other direction of operation permits free rotation between the two members, which are connected with the one-way device. If the torque transmitter is either employed as a brake or retarding device, one of the races, generally the outer race of the one-way clutch is held stationary by a portion of the transmission housing. The other race or generally inner race of the torque-transmitting one-way clutch is connected with a gear element within the transmission.

When the gear element attempts to rotate in one direction, the one-way clutch will lock-up between the gear member and the transmission housing thereby holding the gear member stationary such that a ratio is established within the transmission. When the gear member is driven or rotated in the opposite direction, the one-way clutch permits free rotation between the inner and outer races such that the gear connected therewith is free to rotate relative to the meshing members.

There has been a number of proposals for one-way clutches wherein an actuator mechanism is provided to cause the one-way clutch to be energized in one direction of operation during a portion of the torque-transmitting function and upon actuation of the control mechanism or actuator, the one-way device is operable to be able to transmit torque in the opposite direction of rotation.

Generally, with these devices, the actuating mechanism is either an electrical mechanism or a friction mechanism, which is disposed in series with the one-way torque transmitter. The friction mechanism is generally disposed between the outer race of the one-way torque transmitter and the transmission member to which it is to be connected, generally the transmission housing. However, in most applications of one-way torque transmitters or one-way clutches, the one-way device is fixed within the system to operate in one direction of rotation only.

The design of the one-way clutch has many forms. The one-way clutch may be a roller type, a sprag type, or what is commonly termed a diode type of mechanism. Each of these various mechanical elements within a one-way clutch provides identical functions and can be interchanged without significant design problems.

SUMMARY OF THE INVENTION

It is an object of the present invention to provide an improved selectively operable one-way torque-transmitting mechanism.

In one aspect of the present, a friction actuator and a one-way clutch are disposed in parallel power flow relationship between a rotating transmitting member and a stationary transmission member.

In another aspect of the present invention, the friction actuator has an axially moving mechanism in which engages a portion of the one-way torque-transmitting mechanism to reverse the rotational operation of the one-way torque-transmitting mechanism.

In yet another aspect of the present invention, the friction actuator is a friction disc clutch mechanism.

In yet still another aspect of the present invention, the one-way torque-transmitting mechanism includes an inner race, an outer race, and a plurality of torque-transmitting means disposed between the inner and outer races.

In a yet still another aspect of the present invention, when the friction clutch mechanism is unactuated, the one-way torque-transmitting mechanism is designed to hold or carry torque in one direction of operation.

In a further aspect of the present invention, actuation of the friction actuator provides manipulation of the torque-transmitting members of the one-way torque-transmitting mechanism to provide torque-transmitting characteristics in the opposite direction of rotation.

In a yet further aspect of the present invention, the torque-transmitting members of the one-way torque transmitting mechanism are housed in a cage which is substantially stationary relative to the outer race of the one-way torque-transmitting mechanism and which cage is shifted rotationally during actuation of the friction actuator to manipulate the torque-transmitting members of the one-way torque-transmitting mechanism between the inner and outer races.

DESCRIPTION OF AN EXEMPLARY EMBODIMENT

Figure 1:
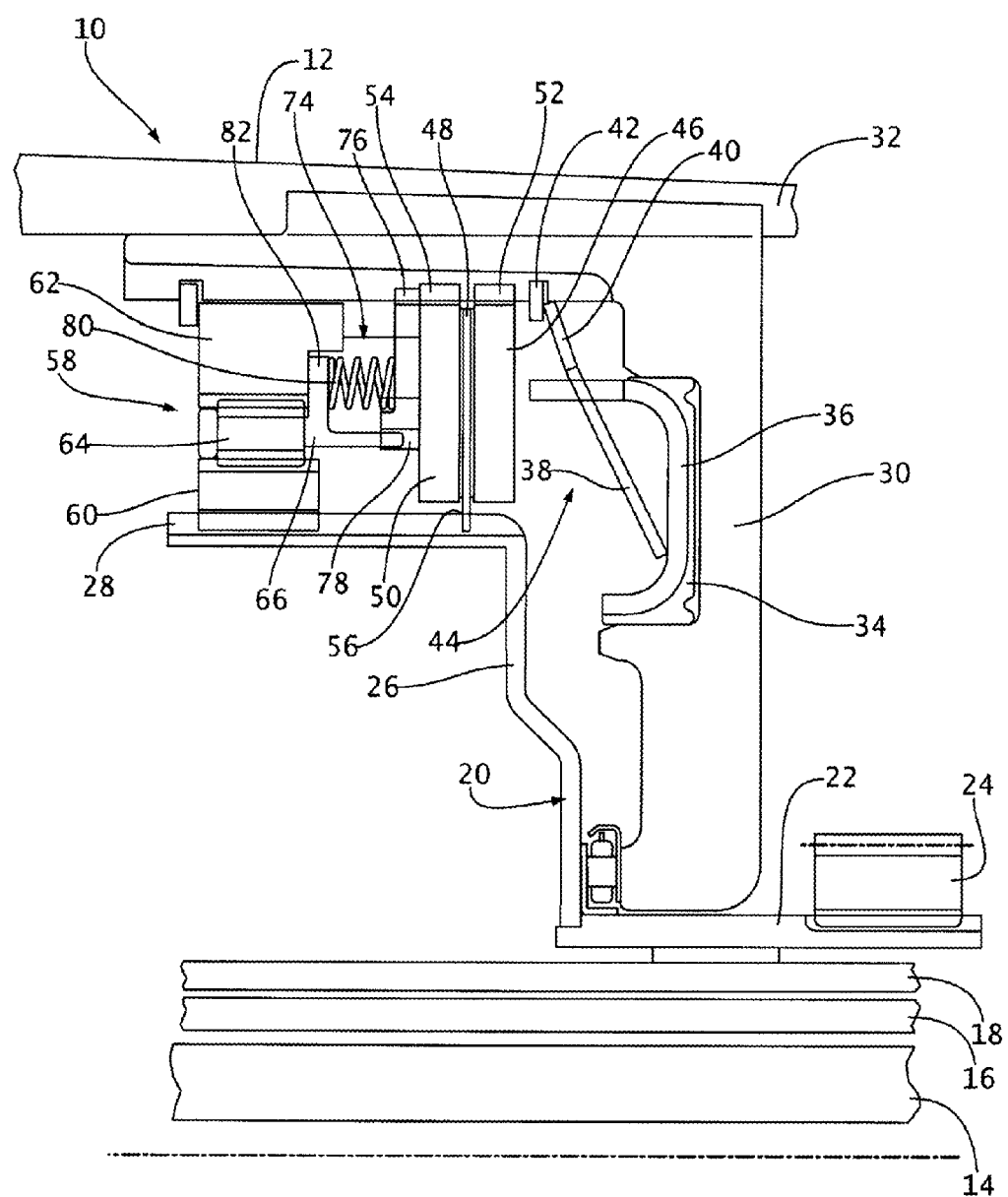
FIG. 1 is a cross-sectional elevational view of a portion of a power transmission incorporating the present invention.

Referring to the drawings, wherein like characters represent the same or corresponding parts throughout the several views, there is shown in FIG. 1 a portion 10 of a power transmission. The portion 10 includes a transmission housing 12, which is stationary relative to the vehicle in which the transmission is mounted. The portion 10 also includes a plurality of shaft members 14, 16, and 18.

The shaft member 18 has rotatably supported thereon a housing 20. The housing 20 has a hub extension 22 to which is drivingly connected a planetary gear 24. The housing 20 has a hub portion 26 including a splined outer diameter 28.

The housing 12 has an extension 30, which extends radially inward from an outer shell 32 of the housing 12. The extension 30 has an apply chamber 34 in which is slidably disposed a fluid-operated apply piston 36. The apply piston 36 is urged rightward into the chamber 34 by a Belleville type spring 38. Fluid is admitted into the chamber 34 through a passage, not shown. Such fluid passages are well known elements of power transmissions. The Belleville spring 38 has an outer portion 40, which is positioned within the housing 12 by a locking or snap ring 42.

The piston 36 is a member of a friction clutch 44, which also includes an apply plate 46, a friction plate 48, and a backing plate 50. The apply plate 46 and backing plate 50 are both connected to the extension 30 through splines 52 and 54, respectively. The friction plate 48 is drivingly connected with the spline 28 of the hub 26 through a spline connection 56.

A one-way torque-transmitting mechanism or a one-way clutch 58 is also disposed between the hub 26 and the extension 30. The one-way clutch 58 has an inner race 60 connected with the spline 28, an outer race 62 splined to the extension 30, and a plurality of one-way torque-transmitting members 64 disposed between the inner race 60 and the outer race 62.

Figure 2:
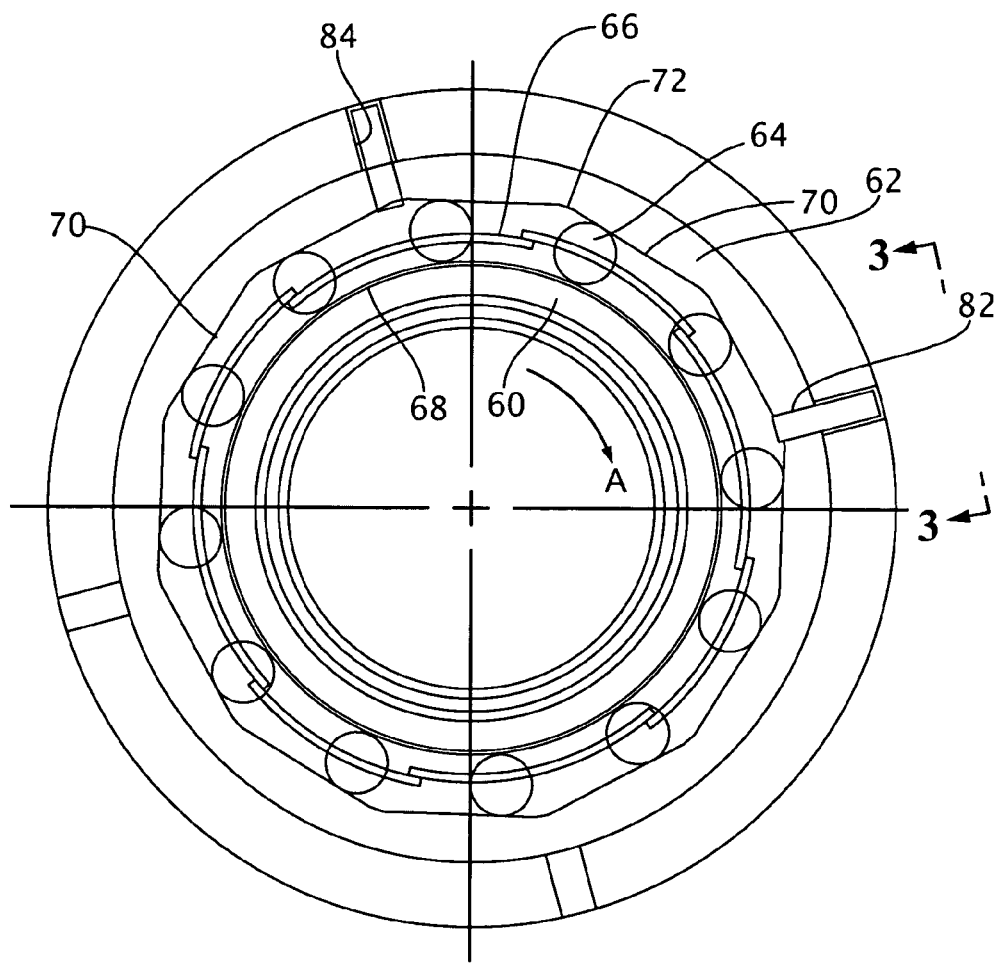
FIG. 2 is an elevational view of a one-way torque-transmitting mechanism that is employed in FIG. 1.

In the exemplary embodiment shown, the torque-transmitting members 64 are in the form of rollers, as best seen in FIG. 2. The torque-transmitting members 64 are housed in a cage 66, which maintains their circumferential space between the inner race 60 and the outer race 62.

As seen in FIG. 2, the inner race 60 has a constant circumference or diameter 68 and the outer race has a plurality of cam surfaces 70. The cam surfaces 70 each have a high rise portion 72, which when positioned between the torque-transmitting members 64 and the races 62 and 60, will permit free rotation of the inner race 60. However, as seen in FIG. 2, if the inner race is moved clockwise in the direction of Arrow A, the rollers of the torque-transmitting members 64 will engage the cam surfaces 70 and prevent relative rotation between the inner race 60 and the outer race 62. Also, on reversing rotation of the inner race 60, the torque-transmitting members 64 will be positioned within the high rise portion 72 of the cam surfaces 70 to permit relative rotation in a counterclockwise direction.

An actuating mechanism 74 is disposed between the backing plate 50 and the one-way clutch 58. The actuating mechanism 74 has an apply plate 76, which is connected with the cage 66 through a spline connection 78. The apply plate 76 is urged away from the cage 66 of the one-way clutch 58 by a plurality of springs 80. The cage 66 has a plurality of outwardly extending arms 82, which engage in respective slots 84 formed in the outer race 62.

Figure 3:
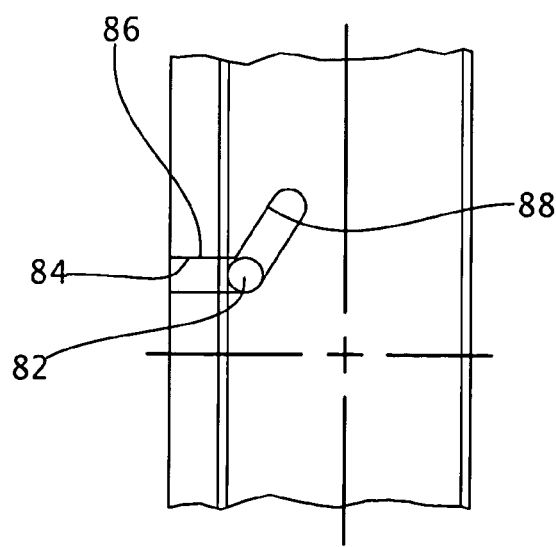
FIG. 3 is a view taken along line 3—3 of FIG. 2.

As seen in FIG. 3, the slots 84 have a substantially axial portion 86 and an oblique ramp or slot portion 88. The oblique portion 88 when engaged by the arms 82 will cause the cage 66 to rotate counterclockwise between the inner race 60 and the outer race 62. This counterclockwise rotation will move the torque-transmitting members 64 from the position shown in FIG. 2 to the opposite side of the high rise portion 72 of the cam surfaces 70. When the torque-transmitting members 64 are disposed on the opposite side of the high rise portion 72, the one-way clutch 58 will be effective to prevent rotation of the inner race 60 relative to the outer race 62 in a counterclockwise direction; that is, the opposite of the direction of Arrow A.

The actuation of the piston 36 causes a friction connection between the apply plate 46, friction plate 48, and backing plate 50. This friction connection occurs, as the elements are moving leftward, as viewed in FIG. 1, to enforce the movement of the arms 82 within the slots 84. When the arms 82 have reached the end of the oblique ramp or slot 88, a friction device will be fully engaged to prevent rotation of the outer race 62 relative to the inner race 60 which would permit the arms 82 to be moved from the oblique portion 88.

The friction actuating member or assembly comprised of the fluid-operated piston 36, the apply plate 46, backing plate 50, and friction plate 48 does not have sufficient torque capacity to prevent relative rotation between the inner and outer races without the assistance of the torque-transmitting members 64. Thus, when the friction actuator is employed to cause the movement of the cage 66, reverse torque applied to the inner race 60 will not be significantly retarded by the friction actuator.

When the piston 36 is unpressurized, the spring 38 will force the piston rightward to the position shown thereby de-energizing friction connection. At this time, the spring 80 will return the cage 66 to the position shown in FIG. 2, which will permit one-way torque transmission as described previously.

The torque-transmitting members 64 are shown as rollers, however, it is well known in the art that these members could be sprag devices or mechanical diode devices, which are energized axially between members rather than radially.

The invention claimed is:

1. A selectively operable one-way torque-transmitting mechanism comprising:
    a friction actuated torque transmitting mechanism;
    a one-way torque transmitting mechanism having an inner race, an outer race, a plurality of torque-transmitting members disposed between said inner and said outer races, and a cage mechanism positioning said torque-transmitting members between said inner and said outer races;
    said friction actuated torque transmitting mechanism being disposed in parallel torque transmitting relation with said one-way torque transmitting mechanism and operable in a first condition to cause said cage mechanism to be moved relative to said inner and said outer races to a first position wherein said torque-transmitting members are positioned therebetween to prevent relative rotation between said inner and said outer races in a first rotational direction and operable in a second condition to cause said cage mechanism to be positioned to prevent rotation between said inner and said outer races in an opposite rotational direction.

2. The selectively operable one-way torque-transmitting mechanism defined in claim 1 further comprising:
    said friction actuated torque transmitting mechanism having a fluid operated piston moveable to a spring set position and a fluid set position to enforce said positioning of said cage mechanism.

3. The selectively operable one-way torque-transmitting mechanism defined in claim 2 further comprising:
    said friction actuated torque transmitting mechanism including an apply plate and a friction plate, said apply plate and one of said inner and outer race being connected to a common transmission element, and said friction plate and said other of said inner and outer race being connected to another common transmission element.

* * * * *